United States Patent [19]

Robbins, III

[11] Patent Number: 4,781,880
[45] Date of Patent: Nov. 1, 1988

[54] METHOD OF FORMING PLASTIC RIBBED ENCLOSURE

[76] Inventor: Edward S. Robbins, III, 459 N. Court St., Florence, Ala. 35630

[21] Appl. No.: 39,950

[22] Filed: Apr. 20, 1987

Related U.S. Application Data

[63] Continuation-in-part of Ser. No. 13,627, Feb. 11, 1987.

[51] Int. Cl.$^4$ ............................................. B29C 49/04
[52] U.S. Cl. ................................. 264/541; 264/154; 264/167; 264/177.1; 425/532; 425/381; 425/466
[58] Field of Search .................. 264/177.1, 167, 541, 264/514, DIG. 81, 568, DIG. 41, 503, 515, 154; 425/532, 381, 466

[56] References Cited

U.S. PATENT DOCUMENTS

| | | |
|---|---|---|
| 405,068 | 6/1889 | Arkell . |
| 515,928 | 3/1894 | Thompson . |
| 595,685 | 12/1897 | Abraham ............................ 383/2 |
| 733,542 | 7/1903 | Converse . |
| 1,207,533 | 12/1916 | Gamble . |
| 1,988,691 | 1/1935 | Lovett . |
| 2,212,390 | 8/1940 | Conklin ............................. 383/2 |
| 2,575,893 | 11/1951 | Seaman ............................. 383/2 |
| 2,750,631 | 6/1956 | Johnson .......................... 264/177.1 |
| 3,229,741 | 1/1966 | Ambrose ............................ 383/2 |
| 3,233,286 | 2/1966 | Batosti et al. ..................... 264/167 |
| 3,459,625 | 8/1969 | Heller, Jr. et al. ................. 264/167 |
| 3,475,767 | 11/1969 | Frieson et al. . |
| 3,589,958 | 6/1971 | Schrenk ........................... 264/564 |
| 3,603,366 | 9/1971 | Albizati ............................ 150/55 |
| 3,819,788 | 6/1974 | Grumbach .......................... 264/167 |
| 3,829,007 | 8/1974 | Ellison . |
| 3,862,868 | 1/1975 | Spillers ........................... 264/173 |
| 3,896,991 | 7/1975 | Kozlowski et al. . |
| 3,902,541 | 9/1975 | Wardwell . |
| 4,064,302 | 12/1977 | Kozlowski et al. ................. 428/152 |
| 4,076,121 | 2/1978 | Clayton et al. .................... 264/177.1 |
| 4,253,507 | 3/1981 | Williamson . |
| 4,315,963 | 2/1982 | Havens ............................ 264/519 |
| 4,353,497 | 10/1982 | Bustin . |
| 4,443,400 | 4/1984 | Herrington ........................ 264/519 |
| 4,453,648 | 6/1984 | Harris et al. ..................... 220/324 |
| 4,519,860 | 5/1985 | Sharps, Jr. ....................... 264/173 |
| 4,536,362 | 8/1985 | Donaldson ........................ 264/171 |
| 4,603,432 | 7/1986 | Marino ............................ 383/2 |

FOREIGN PATENT DOCUMENTS

| | | |
|---|---|---|
| 2508919 | 9/1976 | Fed. Rep. of Germany ... 425/133.1 |
| 43-07466 | 3/1968 | Japan ............................. 264/177.1 |
| 1129609 | 10/1968 | United Kingdom ................. 150/55 |
| 1402963 | 8/1975 | United Kingdom ................. 264/519 |

OTHER PUBLICATIONS

Bekum "Ba-Range-Large Blow Moulding Systems", of Bekum Plastics Machinery, Inc., 04.25 De/06.84 FW/EL.

Bekum "Bae-Range-Single-Station Blow Moulding Machines", of Bekum Plastics Machinery, Inc. 02.33 DE/11.84 FW/EL.

Bekum "BM-Range-The New Generation of Single- and Twin-Station Blow Moulders," Bekum Plastics Machinery, Inc. 02.69 DE/08.85 FW/KUP.

Lemo "Bottom Seal Bag Machines," M. Lehmacher & Sohn GmbH.

(List continued on next page.)

*Primary Examiner*—Jeffery Thurlow
*Attorney, Agent, or Firm*—Nixon & Vanderhye

[57] ABSTRACT

An enclosure having a self-supporting side wall formed of a plurality of laterally spaced ribs with non-self-supporting thin webs therebetween whereby the ribs and webs cooperate one with the other to provide an enclosure having shape-retaining characteristics. A bottom wall is provided constituting an integral extension of the side wall with the ribs being scored at the juncture of the side and bottom walls to permit the material to be folded such that the side wall and bottom wall lie generally normal one to the other. The enclosure has a closure portion including either a substantially rigid portion having a neck with an opening or a self-supporting rib and web closure terminating in the neck and opening. A cap is provided for sealing the enclosure. Blow molding and blown film techniques are used to form the enclosure.

13 Claims, 4 Drawing Sheets

OTHER PUBLICATIONS

"Gloucester 370 Series Polybag Machines 30/41/56", Battenfeld Gloucester Engineering Co., Inc., 1986 (G.E.C. No. 3-27-86).

"Battenfeld Gloucester Engineering," Battenfeld Gloucester Engineering Co., Inc., 1986 (G.E.C. No. 3-26-86).

"25 Years—The Story of Leadership in Blow Moulding Technology", Bekum 01.30E/1083, G.K.W. Kohle Werbung GmbH, Berlin.

Bekum "We Listen, We Respond", Bekum Plastics Machinery, Inc., CAP.2865M.

"Reclaim Extrusion System RE 150/80", Alpine American Corp., Leaflet 75/2e.

"Single-Screw Extruder H5 90T", Alpine American Corp., Leaflet 706/1e.

"Single-Screw Extruders for LLDPE LDPE, HDPE", Alpine American Corp., Leaflet 71-72/1e.

"Blow Heads, Cooling and Calibration for Blown Film Extrusion", Alpine American Corp., Leaflet 73-74/1e.

"Process Control & Information Systems,", Alpine American Corp., Leaflet 704/2e.

"Plastic Processing Machines Film Extrusion, Bag-Making Recycling,", Alpine American Corp., Leaflet 7-8/1e.

"Take-Off Units and Winders", Alpine American Corp. Leaflet 76/1e.

"Oscillating Take-Off Units", Alpine American Corp., Leaflet 815/1e.

"Bag-Making Machines", Alpine American Corp., Leaflet 89/2e.

"Why Blend? A Film Converter Explains", Modern Plastics, Sep., 1985.

"Technology News—For Thin Blown Films: Weight Sensing . . . ", Plastic Technology, Feb. 1984.

"How Alpine Grooved Feed Extruders Control Frictional Heat . . . ", Alpine American Corp. Product Brochure.

"IBC on HMW Film Line? . . . ," Engineering and Processing News, Modern Plastics, Jul. 1985.

"Film-Scrap-Recycling Activity on the Increase in Europe", Plastics Machinery & Equipment, Jul. 1986.

"What Every Film Producer Should Know About the New Economics of Coextrusion", Alpine American Corp., Product Brochure.

"Twin Head Blown Film Lines", Alpine American Corp., Leaflet 704/2e.

"The Wiley Encyclopedia of Packaging Technology," Marilyn Bakker, John Wiley & Sons, Inc., 1986.

U.S. Patent    Nov. 1, 1988    Sheet 1 of 4    4,781,880
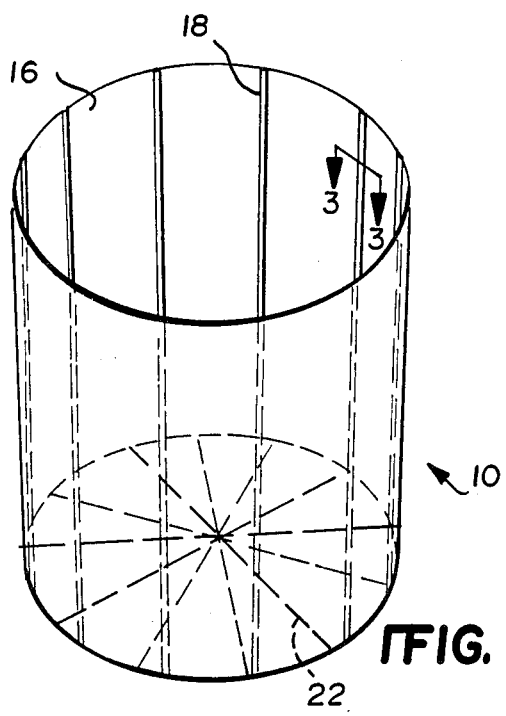
FIG. 1
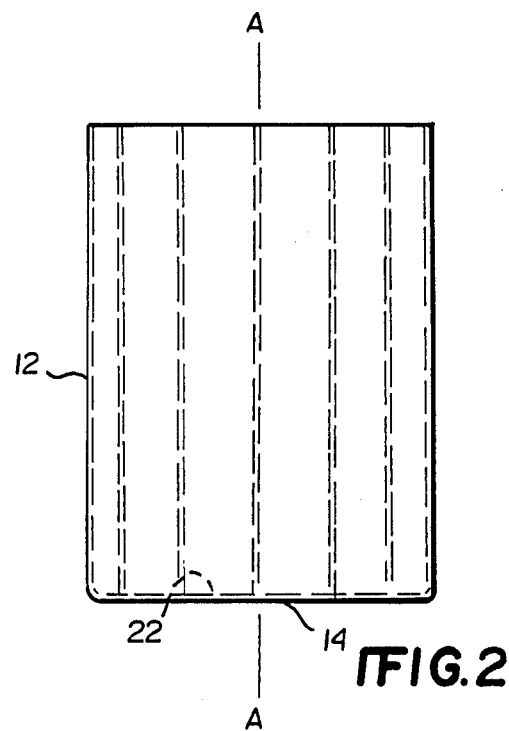
FIG. 2
FIG. 3
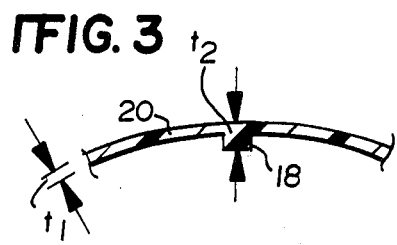
FIG. 3a
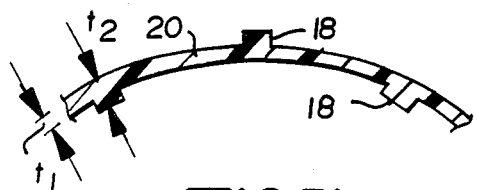
FIG. 3b
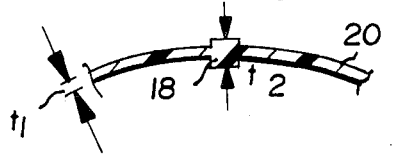
FIG. 3c
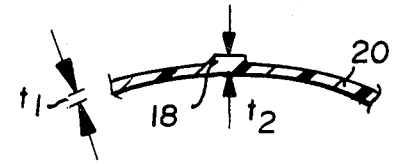
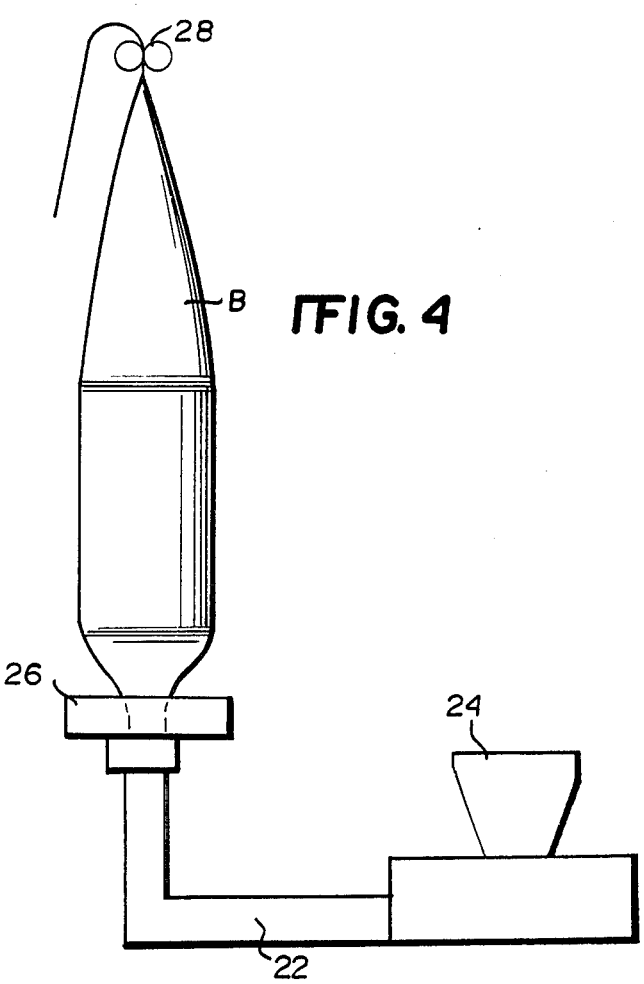
FIG. 4

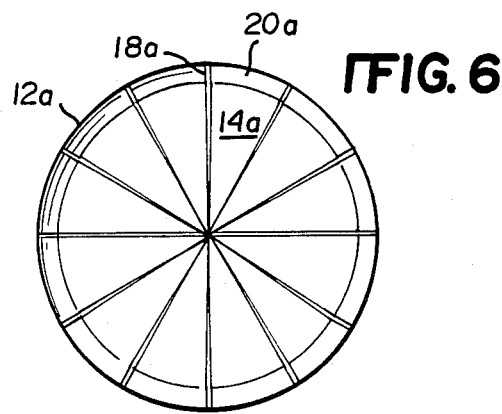
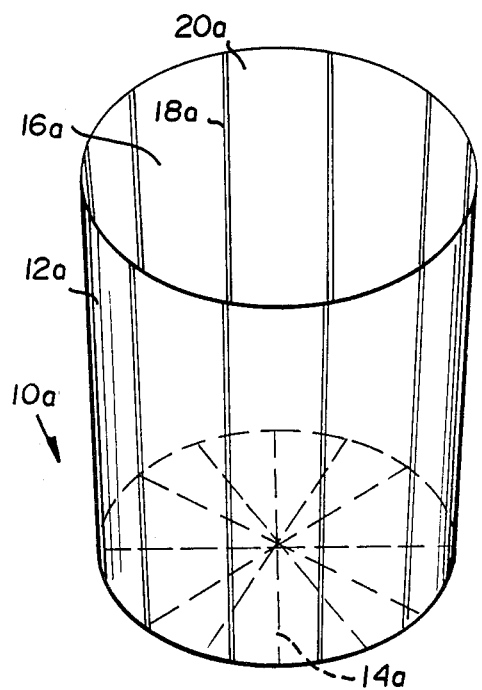
FIG. 6
FIG. 5
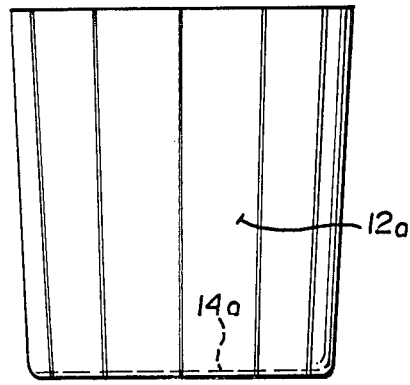
FIG. 7
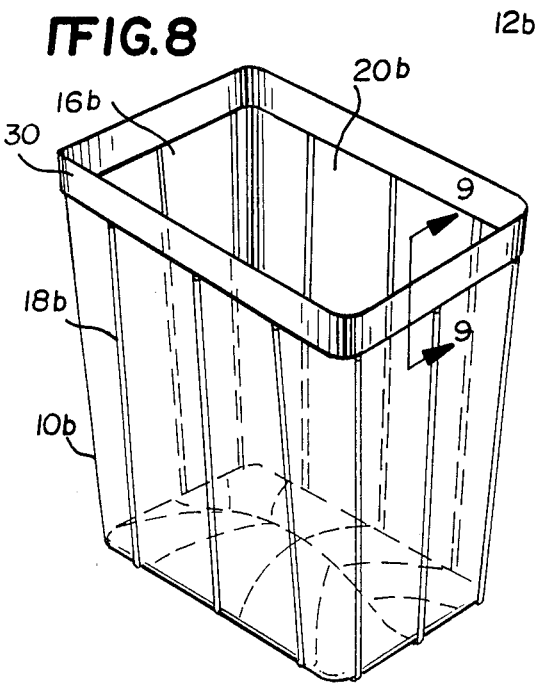
FIG. 8
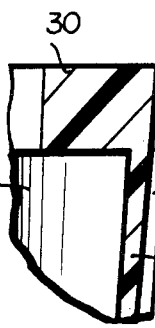
FIG. 9
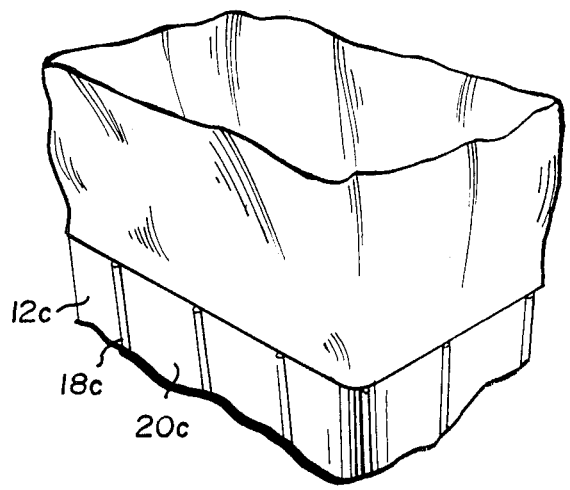
FIG. 10

4,781,880

METHOD OF FORMING PLASTIC RIBBED ENCLOSURE

RELATED APPLICATIONS

This application is a continuation-in-part of Ser. No. 013,627, filed Feb. 11, 1987.

BACKGROUND OF THE PRESENT INVENTION

The present invention relates to an enclosure or container and methods for forming the same. Particularly, the present invention relates to a disposable and/or reusable enclosure formed of plastic material and methods for forming the enclosure.

Different types, styles, and constructions of containers have long been known and used in the past. Likewise, many different materials have been used in the manufacture of containers. For example, the common paper bag, comprised of four side walls, and a bottom wall formed from overlapping and glued flaps of paper, is a well-known construction eminently suitable for its purpose. Cardboard containers, such as boxes, are also quite common and have been provided in various configurations and constructions for a variety of purposes. Plastic containers, such as bottles for containing liquids or thin film plastic bags for disposing of trash, are likewise well known and variously constructed and used. Containers formed of plastic material have significant advantages in comparison with prior paper or cardboard containers. For example, plastic containers are strong, resilient, long-lasting, and inert to most items disposed in the container. They are also suitable for containing and confining fluid materials. Additionally, plastic containers may be currently produced at extremely low cost and may therefore constitute throwaway or disposable items after use.

Common plastic containers of the thin film type, however, have significant disadvantages in comparison with paper or cardboard containers in that the latter are generally self-supporting or freestanding in their intended shape. On the other hand, containers formed of thin plastic film are generally not capable of assuming or maintaining a predetermined shape. Additionally, thin film plastic bags or containers are well known and commonly used by themselves without any supporting structure. However, because these bags are not self-supporting or freestanding, great difficulty attends their filling in the absence of an ancillary support structure. For example, thin film plastic bags are commonly used for disposing of leaves. However, filling these bags with leaves or even maintaining the bag open for filling purposes is difficult because the bags will collapse absent a supporting structure. Thin film plastic bags thus do not have shape-retaining characteristics.

SUMMARY OF THE PRESENT INVENTION

In accordance with the present invention, there is provided an enclosure having a side wall formed unitarily of a plastic material and including a plurality of ribs extending substantially between opposite upper and lower edges of the side wall at laterally spaced positions thereabout. A plurality of flexible non-self-supporting webs interconnect and are disposed between adjacent pairs of ribs, the ribs and webs cooperating one with the other to provide a self-supporting side wall. A bottom wall is also provided along the lower edge of the side wall to close the bottom of the enclosure. Alternatively, the bottom wall may be provided at a distance up the side wall from the lower edge of the side wall. In a preferred form, the enclosure may have a closure portion including a substantially rigid portion having a neck defining an opening for receiving a cap for sealing the enclosure.

In a preferred form of the present invention, the ribs have sufficient thickness to have shape-retaining characteristics whereby the ribs are not readily bent, flexed or deformed from their elongated linear extent or dimension. On the other hand, the webs extending between adjacent pairs of ribs about the enclosure are preferably formed of a thin, non-self-supporting film of plastic material. In this manner, when the side wall of the enclosure is disposed in a substantially vertical or upwardly tapered configuration, the ribs and webs cooperate one with the other to define a self-supporting side wall.

While a preferred embodiment hereof provides an enclosure formed of a cylindrical configuration, the side wall of the enclosure may be formed of any desired cross-sectional configuration and may be tapered from the bottom wall. In both forms, i.e., the cylindrical and tapered forms, the enclosure may be collapsed inwardly toward its central axis for transportion and storage purposes. Thus, the webs fold onto themselves and fold inwardly whereby the ribs are closely spaced one next to the other about and generally parallel to the axis of the enclosure. The bottom wall may be folded inwardly in conjunction with the collapsing of the ribs inwardly toward the axis of the enclosure. Alternatively, the bottom wall need not fold. In the tapered configuration of the enclosure, multiple enclosures may be nested or stacked one within the other for transport and storage.

It will be appreciated that the ribs may be formed of any cross-sectional configuration, such as rectangular, semi-circular, triangular or otherwise so long as the ribs maintain their capacity to not readily bend, deform or flex about their long dimension whereby those ribs in conjunction with the webs provide the self-supporting side wall for the enclosure. In manufacturing the enclosure hereof, the ribs and webs may be formed unitarily of like plastic material, such as high-density polyethylene. Alternatively, the ribs and webs may be formed unitarily of different plastic materials, for example, high and low-density polyethylenes, respectively. Completely different plastic materials may also be used, for example, when using a coextrusion process. Additionally, the ribs may be formed separately of the sheet material and individually applied thereto.

In one form of the present invention, a band of thickened plastic material is formed adjacent the open upper end of the container. The band provides rigidity to the open end whereby the enclosure may not collapse about its central axis. In another form hereof, the enclosure may be provided with an upper portion of thin film plastic material. That is, the thin film plastic material may constitute an integral extension of the plastic material forming the ribs and webs of the side wall of the enclosure. The thin film plastic material is non-self-supporting and thus provides a top for the enclosure which may be gathered and secured, for example, by a tie, to close the enclosure.

In another form hereof, the upper edge of the enclosure formed of ribs and webs as previously described is connected to a rigid closure. In this form, the rigid closure may constitute a rigid continuation of the ribbed enclosure. A handle can be integrally formed in the closure or separately attached thereto. Additionally, the rigid closure may have a neck defining an opening to which a cap may be applied, for example by cooperating screw threads, to releasably seal the opening. The enclosure hereof may therefore be readily adapted to contain solid materials as well as liquid materials. Thus, the enclosure of this form may be used as a portable disposable or non-disposable container for liquids, such as a milk container, a baby bottle, a canteen, etc.

In manufacturing the cylindrical ribbed enclosure hereof, any method of manufacturing may be used including blown film and blow molding techniques. In this blown film manufacturing technique, plastic material is extruded through an annular slit between opposed die parts in an upward or downward direction to form a generally cylindrical side wall which encapsulates or encloses an air bubble. The upper ends of the side wall are passed through a pair of rolls and the sheet material is subsequently cut to form an elongated tube of ribbed material. An end portion of the latter material is then folded inwardly and heat sealed to form the bottom wall of the enclosure. To facilitate folding, the ribs may be partially scored or substantially completely severed, leaving only a thin film of material at the juncture of the side and bottom walls.

Where the side wall of the ribbed enclosure is tapered or has a cross-sectional configuration other than cylindrical, the enclosure may be formed by blow molding techniques. Of course, blow molding techniques may be used for cylindrical configurations of the enclosure and are preferably used where a rigid top closure is used. In such process, a plastic material extruder, having an annular slit defined by opposed die parts, one of which has a plurality of circumferentially spaced grooves thereabout, extrudes a downwardly extending cylindrical parison having alternating ribs and webs. Mold platens are provided on opposite sides of the parison and are movable to close about the parison whereby, by conventional blow molding techniques, the tapered ribbed enclosure with bottom wall may be formed. The rigid closure may also be formed in this manner.

In certain situations, it may be desirable to co-extrude the enclosure of different plastic materials. In other situations, it may be desirable to utilize multi-layered materials.

Alternatively, the side and bottom walls could be formed separately and joined (for example) by heat sealing.

Accordingly, it is a primary object of the present invention to provide a novel and improved ribbed enclosure and a method of forming the enclosure which is inexpensive to construct, uses a minimum of plastic material, is disposable or reusable as desired, has fluid retention characteristics, and is readily collapsible or nestable for transport and storage. These and further objects and advantages of the present invention will become more apparent upon reference to the following specification, appended claims and drawings.

BRIEF DESCRIPTION OF THE DRAWING FIGURES

FIG. 1 is a perspective view of an enclosure constructed in accordance with the present invention;

FIG. 2 is a side elevational view of the enclosure illustrated in FIG. 1;

FIG. 3 is an enlarged cross-sectional view thereof taken about on line 3—3 in FIG. 1;

FIGS. 3a-3c are views similar to FIG. 3 illustrating various forms of side wall rib and web construction;

FIG. 4 is a schematic view illustrating one form of apparatus for forming an enclosure in accordance with the present invention;

FIG. 5 is a perspective view of another form of enclosure constructed in accordance with the present invention;

FIG. 6 is a top plan view of the container illustrated in FIG. 5;

FIG. 7 is a side elevational view thereof;

FIG. 8 is a perspective view of a still further form of an enclosure constructed in accordance with the present invention;

FIG. 9 is an enlarged fragmentary cross-sectional view taken generally about on lines 9—9 in FIG. 8;

FIG. 10 is a fragmentary perspective view of still another form of enclosure formed in accordance with the present invention;

Figure 11:
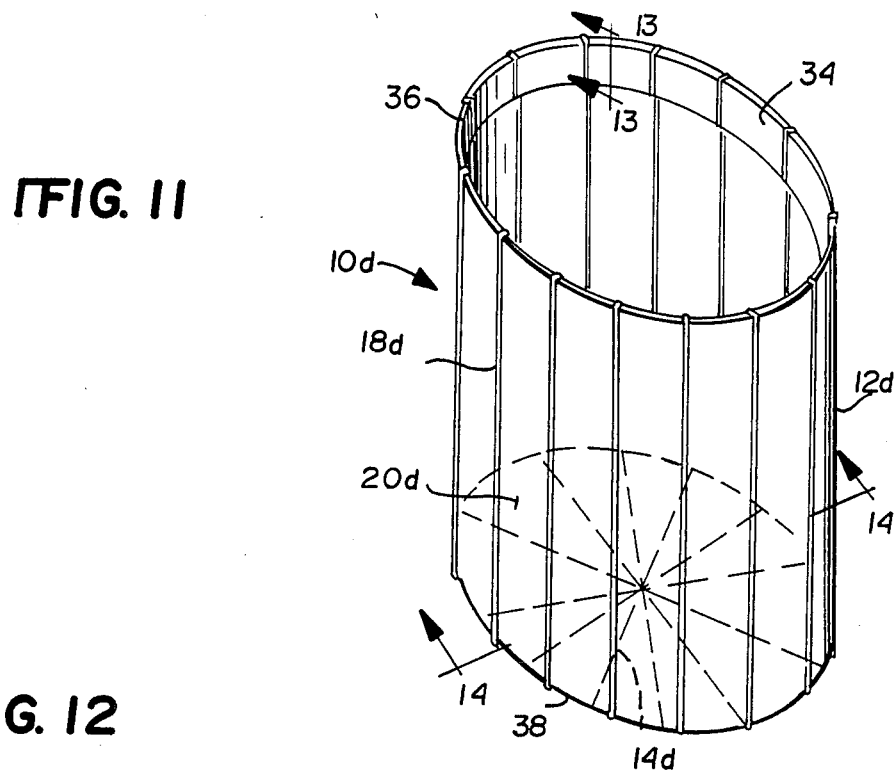
FIG. 11 is a perspective view of a further form of enclosure constructed in accordance with the present invention.
Figure 13:
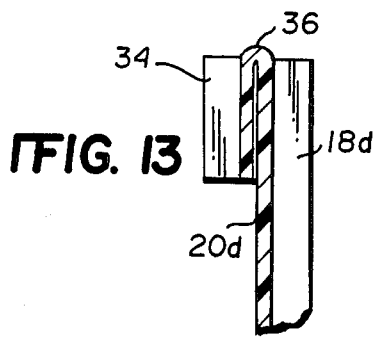
Figure 14:
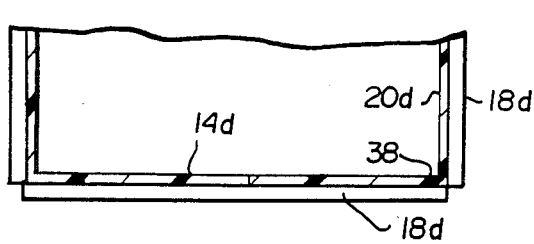
Figure 15:
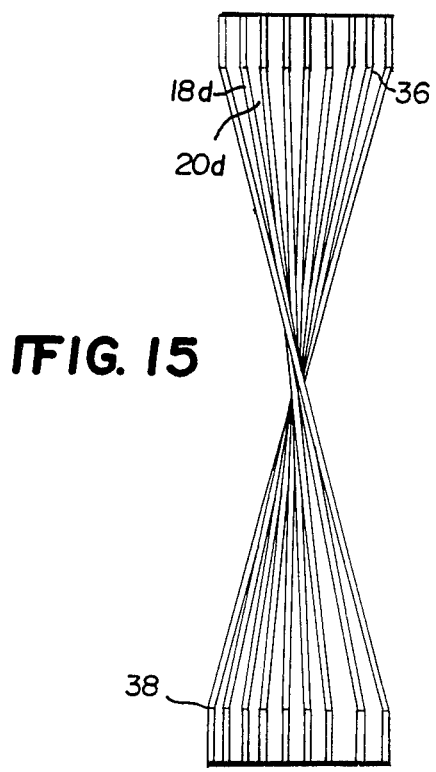
Figure 16:
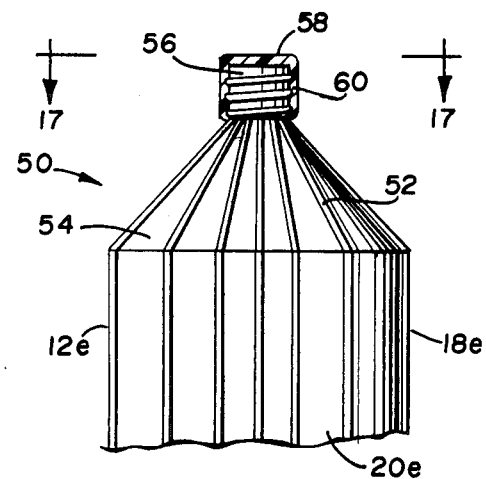
Figure 17:
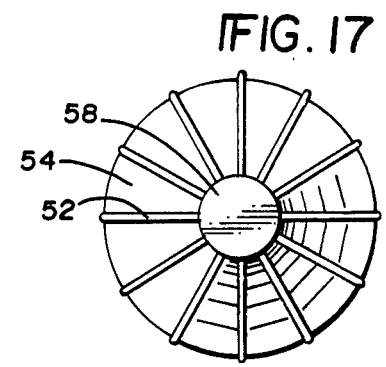
Figure 18:
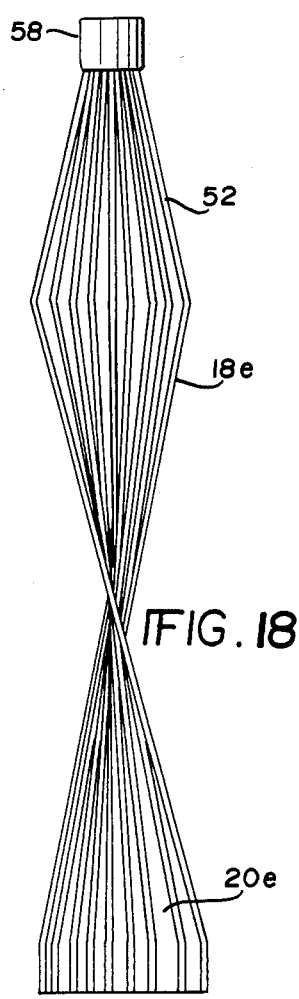
Figure 19:
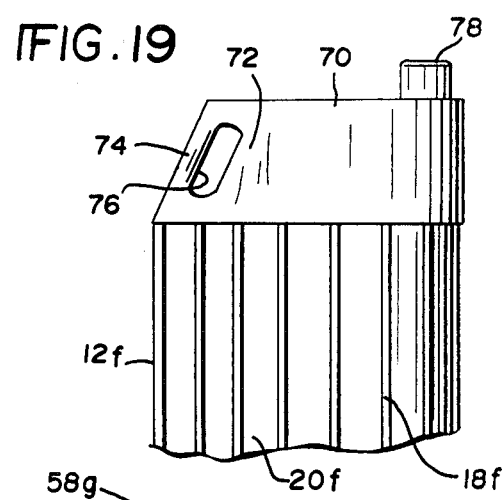
Figure 20:
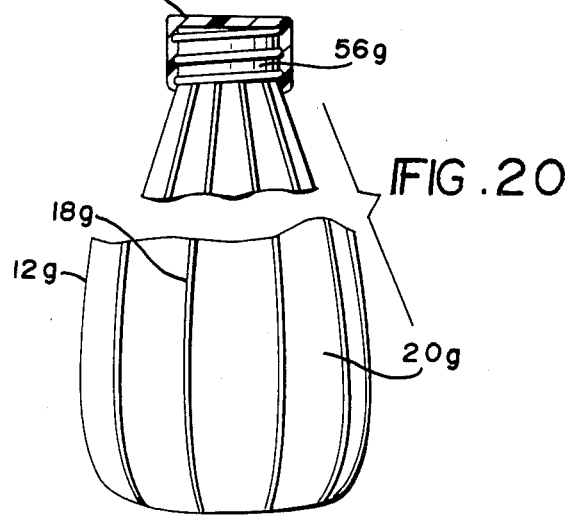

FIGS. 13 and 14 are enlarged fragmentary cross-sectional views of the enclosure of FIG. 11 taken generally about on lines 12—12 and 13—13, respectively;

FIG. 15 is a perspective view of the enclosure of FIG. 11 in a collapsed condition for transport and storage; and FIGS. 16 and 20 are fragmentary side elevational view of still further form of enclosure constructed in accordance with the present invention;

FIG. 17 is a plan view thereof taken generally about on lines 17—17 in FIG. 16;

FIG. 18 is a perspective view similar to FIG. 15 illustrating the enclosure of FIGS. 16 and 17 in a collapsed condition for transport and storage; and FIG. 19 is a fragmentary side elevational view of a still further form of enclosure constructed in accordance with the present invention.

DETAILED DESCRIPTION OF THE DRAWING FIGURES

Reference will now be made in detail to the preferred embodiment of the present invention, several examples of which are illustrated in the accompanying drawings.

Referring now to the drawings, particularly to FIG. 1, there is illustrated an enclosure, generally designated 10, constructed in accordance with the present invention. Enclosure 10 is comprised of a generally tubular shaped cylindrical side wall 12, closed at its lower end by a bottom wall 14. Enclosure 10 is preferably formed of a unitary one-piece plastic construction including the side and bottom walls 12 and 14, respectively. The enclosure preferably is open at its upper end, as indicated at 16.

It is a particular feature of the present invention that the enclosure hereof may be formed of a one-piece plastic construction with minimum use of plastic material, yet retains structural definition, for example, in the illustrated form, as a container. The enclosure is also collapsible about its long axis A—A (FIG. 2) which, in the embodiment of the enclosure illustrated in FIGS. 1-3, constitutes the centerline of the enclosure circumscribed by the side wall 12. To these ends, side wall 12 is formed of an alternating web and rib construction, preferably formed of unitary plastic material, although the ribs and webs may be separately formed as described hereinafter. Particularly, side wall 12 comprises a plurality of upstanding ribs 18 laterally spaced one from the other about enclosure 10 together with webs 20 disposed between ribs 18. As best illustrated in FIG. 3, the wall thickness t1 of the ribs is greater than the wall thickness t2 of the material forming the webs, the thicknesses t1 and t2 being measured in a radial direction. Webs 20 are formed of a plastic material having a thickness sufficiently small that the webs per se are flexible and non-self-supporting. That is, webs 20 are formed of thin plastic film which, in the absence of additional structure, is incapable of supporting itself.

Ribs 18, however, are formed of a thickness in radial and circumferential directions sufficient to provide structural rigidity in the length dimension of the ribs. Consequently, with ribs 18 alternately spaced about the circumference of enclosure 10 and with a web 20 disposed between each adjacent pair of ribs, the ribs and webs cooperate one with the other to provide a self-supporting or self-standing side wall 12 when the enclosure is expanded into its outermost position limited by the material forming side wall 12. Consequently, the structural rigidity afforded side wall 12 by ribs 18 and the cooperating support provided each rib by the webs between it and adjacent ribs enables side wall 12 to maintain structural definition of the enclosure.

The ribs 18 are illustrated in FIG. 3 as lying along the inside surface of the side wall 12 of enclosure 10. It will be appreciated, however, that the ribs of the enclosure may alternately lie along the inside and outside surfaces of the enclosure vis-a-vis webs 20, as illustrated in FIG. 3a or in any other inside and outside sequence as desired. In another form, the webs on opposite sides of each rib may join the rib intermediate its depth, e.g., its radial dimension, as illustrated in FIG. 3b. In a still further form, the ribs 18 may lie along the outside surface of side wall 12 as illustrated in FIG. 3c. Thus, in each of these constructions, as well as the construction wherein the ribs and webs are formed separately, the ribs and webs cooperate to maintain structural rigidity and definition of the enclosure.

As will be appreciated from the ensuing description, the enclosure 10 is formed from tubular or cylindrical stock material, for example as generated in a blown film manufacturing process schematically illustrated in FIG. 4. By simply cutting lengths of tubular stock material in excess of the length of side wall 12 and folding the excess material inwardly, the bottom wall 14 may be formed. Thus, the material forming bottom 14 may be of the same material forming side wall 12. The side walls of the excess stock material below the intended location of bottom wall 14 therealong may thus be folded or gathered inwardly with the webs being folded between the substantially radially extending ribs. The folded ribs and webs may be heat sealed to close the bottom of the enclosure and thus form bottom wall 14.

To enable the ribs to be folded, they may be scored, for example, by a heat bar, to a thickness approximately the thickness of the web material at the juncture of the side wall 12 and bottom wall 14. When external ribs are used, the heat bar forms an external slit or cutout, leaving only thin material comparable to web 20 enabling the ribs forming bottom wall 14 to be folded inwardly together with the webs 20 therebetween. The other rib configurations illustrated in FIGS. 3, 3a and 3b may be scored similarly to reduce the thickness of the rib at the juncture of the side wall and bottom wall to enable the ribs and connecting webs forming the bottom wall to be folded inwardly.

Alternatively, an edge of the ribbed stock material may be heat sealed together prior to or contemporaneously with folding the ribs and webs inwardly to form the bottom wall. The heat seal, in conjunction with the heat bar used to score the ribs, as previously described, enable the bottom of the enclosure below the scored ribs to be folded inwardly to form the bottom wall of the enclosure.

In forming the unitary enclosure hereof, the ribs may be formed of plastic material having a wall thickness t2 (in the radial direction or normal to the circumferential direction) of about 5–250 mils, whereas the wall thickness t1 of webs 20 may be about 1–40 mils. However, it will be recognized that thicknesses outside of these ranges can be used for certain applications, provided only, however, that the ribs and webs cooperate one with the other to provide an enclosure side wall which is self-supporting or self-standing. Preferably, the ribs and webs are both formed of high density polyethylene. However, other materials may be used. For example, in another form, the ribs and webs may be formed of high and low density polyethylene and other suitable thermoplastic materials as desired. Also, the ribs and webs may be co-extruded from different materials to form a unitary plastic enclosure.

Turning now to FIG. 4, there is illustrated a blown film system for forming the enclosure illustrated in FIGS. 1–3 hereof. Particularly, the blown film system includes an extruder 22 connected at one end to a hopper 24 which receives raw plastic material. The extruder plasticizes the material and feeds the plasticized material to a die head 26. Die head 26 includes opposed mold platens which form a generally circular slit through which plastic material issues in the form of a cylindrical thin film which forms a bubble B upstanding from die head 26. One or both of the mold platens are formed with grooves circumferentially spaced around the slit in order to extrude from the die head a cylinder of plastic material having ribs and webs and which constitute the bubble B. The grooves may be formed in the inner surface of the outer mold platen or on the outer surface of the inner mold platen depending on whether the ribs of the enclosure produced thereby are intended to lie externally or internally of the enclosure, respectively. The grooves may also be formed alternately on the mold platens or in registry one with the other on the opposite mold platens. Grooves may be provided as desired to accommodate the location of the ribs vis-a-vis the webs, as illustrated in FIGS. 3–3c. In blown film apparatus, air is provided by conventional means to maintain the stability of the bubble B. That is, air supplied within bubble B maintains the latter inflated as the extrudate passes from the die head upwardly between a pair of rolls 28 at the upper ends of bubble B and the blown film apparatus. Because the plastic material forming the bubble B is sufficiently cooled as it moves upwardly, the side walls of the bubble B may be brought together between rolls 28 for passage therethrough and without losing definition of the ribs and webs.

In a preferred form, soft rubber rolls 28 are provided at the top of the blown film apparatus to accommodate the grooves in the plastic material as it passes through the rollers in doubled sheet form closed along the lateral edges. While some air leakage may be accommodated, it is preferable that the bubble be substantially sealed between the rolls 28 and die head 26. The ribbed sheet plastic material is taken from the rolls 28 to a cutting and forming station, not shown, where the sheet material is cut to the appropriate length, i.e., a length sufficient to form an enclosure of the appropriate height and an additional length from which the bottom wall of the enclosure may be formed. Automatic folding machines are provided for folding the excess length to form the bottom wall. Preferably, heat-sealing is used to close the bottom of the enclosure.

Referring now to FIGS. 5, 6 and 7, there is illustrated a further form of enclosure constructed in accordance with the present invention. In this form, like reference numerals are applied to like parts, followed by the suffix "a". Enclosure 10a is similar to the previous form of enclosure having side walls 12a, a bottom wall 14a and an open top. However, in this form, side walls 12a taper upwardly and outwardly from the bottom wall 14a forming a tapered enclosure. Similarly, as in the previous embodiment, the ribs 18a are formed of a plastic material of sufficient thickness so that they retain structural definition in their lengthwise direction. Likewise, the webs 20a disposed between adjacent ribs 18a are formed of a thin film plastic material which per se is non-self-supporting.

To form enclosure 10a, blow molding techniques are preferably utilized. Such technique is described in detail in my co-pending U.S. patent application Ser. No. 008,658, filed Jan. 30, 1987, the disclosure of which is incorporated herein by reference. As set forth in that patent application, plasticized material is fed from an extruder to a die head and extruded in the form of a cylinder or parison. Mold platens disposed on opposite sides of the parison and having the desired shape of the enclosure formed on their inside surfaces, close about the parison. A blow tube is disposed within the parison as the mold platens close to inflate the parison against the mold surfaces to form the product. To form the tapered ribbed enclosure hereof using that process, the die head is provided with a plurality of notches or grooves at circumferentially spaced positions about the opposed die parts. The notches or grooves may be formed on the inner or outer surfaces of the exterior and interior die parts, respectively, or on both surfaces whereby, upon extrusion of the plasticized material, the ribs may be formed, for example, to achieve the ribbed construction illustrated in FIG. 3–3c. Preferably, the ribs are formed along the inside surface of the parison such that the mold platens have smooth interior surfaces for forming the exterior surface of the enclosure. The bottom wall 14a of the enclosure is also formed directly in the mold.

It will be appreciated that the ribbed enclosures set forth in FIGS. 1-3 and 5-7, as well as FIGS. 11-15 to be described, are readily foldable or collapsible about their central axes A—A for storage or transport. To accomplish this, the side walls of the enclosures may be collapsed inwardly toward central axes A-A with the flexible webs 20 folding upon themselves and against one another. The bottom wall 14 may be tucked up inwardly into the enclosure as it is being collapsed. In this manner, the volume or space occupied by the enclosure for storage or transport is substantially reduced in comparison with the volume occupied thereby in use.

In both of the embodiments previously described, it may be desirable to provide additional rigidifying support structure at one or the other or both of the opposite ends of the enclosure. To accomplish this, a hoop or spoked wheel may be formed to the diameter of the ends of the enclosure in which it will be placed. The wheel or hoop is preferably formed of plastic material so that it is structurally self-supporting in its circular configuration. Thus, the wheel may be disposed at the bottom of the enclosure to maintain the side walls adjacent the bottom in a generally circular configuration. A hoop may be likewise disposed about the upper edge of the enclosure or intermediate its edges.

Referring now to FIGS. 8 and 9, there is illustrated another form of enclosure constructed in accordance with the present invention. In this form, the container 10b may be formed similarly as indicated above with respect to the enclosures illustrated in the embodiments of FIGS. 1-3 and FIGS. 5-7. In this form, however, enclosure 10b is generally rectangular in cross-sectional configuration and tapered upwardly and outwardly towards its open end 16b. That is, side wall 12b comprises opposed side wall portions disposed in a rectangular configuration. Side wall 12b also tapers upwardly and outwardly from bottom wall 14b. As in the previously described embodiments, ribs 18b provide structural stability to the container while the non-self-supporting webs 20b extend between adjacent ribs.

To maintain the enclosure in a fully open condition as illustrated in FIG. 8, a band 30 of thickened plastic material may be formed about the upper margin of the enclosure. Alternatively, one can utilize a separate snap-on ring about the upper margin of the enclosure. Such ring, not shown, may be channel-shaped with outwardly flared distal edges which, when inverted, may receive the upper edge of the enclosure. In this case, the enclosure could be collapsible upon removal of the ring.

The band 30 extends about the upper margin of the enclosure and has a thickness greater than the thickness of the ribs 18b to impart rectangular shape retention characteristics to the open top of the enclosure. The band 30 can be readily formed on the container in the blow molding process by controlling the width of the slot at the die heads, as set forth in my co-pending application identified above, when forming the parison. Thus, for example, the enclosure illustrated in FIG. 8 may be formed by extruding a parison having ribs in the manner indicated above. When the first portion of the parison corresponding to the body of the enclosure with the ribs has been extruded, the die head may be controlled to extrude a thickened portion. Disposition of the parison with its thickened upper portion in the mold platens results in the enclosure configuration illustrated in FIG. 8.

Alternatively, the mold platens may be formed to accommodate and thus form two enclosures of the type illustrated in FIG. 8 in a single molding process. To accomplish this, the parison is first extruded with the ribs. The die head is then adjusted to extrude a thickened portion having approximately twice the length of the thickened band 30 on the enclosure illustrated in FIG. 8. The die heads are then adjusted to extrude the ribbed portion. Thus, a parison having a first ribbed portion, a thickened portion, and a second ribbed portion depends from the die head for dispoition between the mold platens. The mold platens are, of course, formed to accommodate the parison to mold a pair of enclosures in opposing end-to-end relation. When the mold platens are opened, the enclosures may be separated by cutting about the enclosure at the band.

In one important aspect of the present invention, the enclosures which are tapered, and particularly those having a reinforcing rib about the opening, for example as in the embodiment of FIG. 10 where the enclosure may not be collapsible, may be provided in configurations wherein they can be stacked or nested within one another to minimize the space required for transportation and storage. Additionally, the enclosures may be used in their stacked condition by using the uppermost stacked enclosure, removing it when filled from the stack and then using the next stacked enclosure. To this end, the enclosures are formed in a tapered configuration (see FIGS. 5–7 and 8–9). Thus, in each instance, the side wall tapers upwardly and outwardly from the bottom wall toward the open upper end whereby the enclosures can be nested one within the other.

In the embodiment hereof illustrated in FIG. 10, there is illustrated a generally rectangular enclosure having the ribbed wall construction previously described. In this form, however, the web 20c is formed to extend beyond the ends of ribs 18c to provide a flexible non-self-supporting upper portion to the container. That is, the upper portion of the container is formed of thin film plastic which per se is non-self-supporting. Consequently, the container body, by virtue of the mutual supporting characteristics of the ribs and the webs disposed between the ribs, as previously described, is self-supporting and shape-retaining, whereas the upper portion is non-self-supporting, non-shape-retaining and collapsible. Thus, an enclosure is provided wherein the top flexible portion may be gathered and tied to close the enclosure. Additional benefits and advantages of this construction will be recognized from a review of my above-identified prior patent application, whose disclosure is specifically incorporated by reference herein. It will be appreciated, of course, that the body of the enclosure need not be rectangular in shape and that circular or other shapes may be provided in conjunction with the flexible extension at the top of the enclosure.

To form the enclosure with the flexible portion at the top thereof, a die head may be used wherein the grooves formed in the one die part are selectively closed and opened. Thus, the die head extrudes a first parison portion with the grooves or notches covered to form a thin plastic film and, subsequently, the grooves or notches are uncovered to form a following parison portion with the ribbed configuration. The process then continues with the parison portions being disposed in a blow mold as will be appreciated by those skilled in this art.

Turning now to the embodiment of the enclosure illustrated in FIGS. 11 through 14, the enclosure 10d is formed similarly as the previously described enclosures having ribs 18d spaced one from the other about the enclosure to define webs 20d therebetween. A bottom wall 14d, together with an upper turned flange 34, is also provided as described hereinafter. In this form, rather than forming the enclosure 10d integrally, the enclosure 10d is formed from a non-self-supporting flexible sheet plastic material, for example as may be derived from the blown film extrusion process illustrated in FIG. 4, but without the ribs formed integrally on the sheet material. Thus, the sheet material forms an enclosure to which ribs are subsequently applied. Ribs 18d may constitute elongated strips having cross-sectional configurations which provide for longitudinal rigidity and shape-retaining characteristics. For example, T-shaped, I-beam or channel-shaped strips may be provided. The strips may then be applied to the sheet material at laterally spaced locations thereabout, for example with adhesives or through heat sealing processes. Thus, the side wall 12d of the enclosure may be formed by applying the ribs directly to the sheet material whereby individual webs 20d of the sheet material appear between the laterally spaced ribs 18d.

As will be appreciated from a review of FIG. 11, the sheet material and ribs extend beyond both the upper and lower edges or junctures 36 and 38, respectively, of the enclosure to provide sufficient material to form the bottom 14d and the upper flange 34. As previously described, the closure 10d may be disposed in a flat condition with the bottom portion 14d and flange 34 constituting planar extensions of the side wall 12d. In that condition, a heat bar, schematically illustrated at 40 in FIG. 12, may engage the sheet material along opposite sides at each of the intended juncture 38 between the side wall 12d and bottom wall 14d on the one hand and juncture 36 between the side wall 12d and the flange 34 on the other hand. The heat bar scores or generally reduces the thickness of the ribs at the locations of these junctures, leaving a thin film at the juncture comparable to the thickness of the web 20d. That is, the ribs 18d may be scored completely through or only partially through, in both cases sufficiently to enable the ribs to be folded at the junctures. Additionally, the extreme edge of the sheet material which will form the bottom 14d may be severed from the continuous flowing sheet material in the automated manufacturing process by a heat sealing apparatus schematically indicated 42 whereby the opposite edges of the sheet material are heat sealed one to the other. With the lower edge of the sheet material thus sealed and the ribs scored at the juncture of the side wall 12d and bottom 14d, the bottom 14d may be folded inwardly of the enclosure to form a bottom wall substantially normal to the side walls.

Similarly, the flange 34 may be formed. That is, a heat bar may be applied to the opposite sides 20 of the sheet material to score the ribs 18d, leaving only the web material or a web material and a portion of the rib material at the juncture. The flange 34 may be folded inwardly as illustrated and serves to maintain and define the intended shape of the enclosure 10d.

Figure 12:
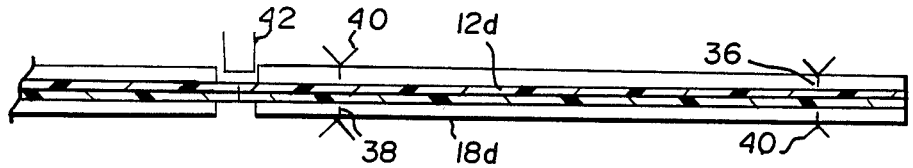
FIG. 12 is an enlarged cross-sectional view of flat superposed ribbed sheet material used to form the enclosure of FIG. 11.

While the enclosures hereof which do not have thickened portions as illustrated in FIGS. 8 and 9 and are formed solely of the rib and web construction, may be provided for transport and storage in a flat configuration, for example as illustrated in FIG. 12, they also may be provided in a collapsed configuration as illustrated in FIG. 5. In this form, the bottom 14 of the enclosure may be either folded upwardly and inwardly to within the confines of the side wall or left to project as a continuation of the side wall. In either case, and because of the web portions between the ribs, the container may be collapsed inwardly toward its axis A—A for purposes of storage and transport. Upon use, the side walls are simply displaced outwardly and this automatically enables the bottom wall to be displaced into a position where it is generally normal to the side wall.

As will be appreciated from the foregoing, the enclosure hereof may be adapted to carry fluid material. Thus, in the embodiment hereof illustrated in FIGS. 16–18, there is provided another form of enclosure specifically adapted to carry liquid. In this form, the body of the enclosure may be formed similarly as in the embodiment of FIG. 1, with a cylindrical side wall 12e having upstanding ribs 18e and webs 20e formed between ribs 18e. In this form, a cover, generally designated 50, is provided along the upper edge of the enclosure 12e. Preferably, the cover 50 forms a continuation of the rib and web construction of the side wall 12e of the enclosure. In this form, the ribs and webs of the cover, designated 52 and 54, respectively, extend inwardly and upwardly from the upper edge of side wall 12e, terminating at an apex in the form of a rigid closure part 56. Part 56 may comprise a neck, which cooperates with a cap 58, for releasably sealing the enclosure. For example, the neck 56 may have screw threads 60, which cooperate with internal threads on a cap 58.

It will be noted that the ribs 52 converge inwardly in an upward direction, with the spacing between the ribs and constituted by the webs 54 likewise decreasing. Blow molding techniques may be used in forming this type of container. For example, the opposed mold platens may be internally ribbed to form the ribs of both an enclosure and cover and have a smooth portion with horizontal ribs to form the threads of enclosure part 56. Alternatively, the cover 50 may be formed of a solid material and heat welded or otherwise applied to the upper edge of the enclosure. Preferably, however, the cover 50 is formed of the rib and web construction similarly as the rib and web construction of the enclosure whereby the cover is self-supporting.

It will be appreciated that, while a cylindrical enclosure with a frusto-conical cover 50 is described and illustrated, other cross-sectional shapes of the enclosure and cover may be provided. For example, the enclosure could be rectangular in cross-section, with a correspondingly shaped cover having its enclosure part located toward one side or the other of the enclosure.

Referring now to FIG. 18, it is a particular feature of the embodiment hereof illustrated in FIGS. 16 and 17 that the enclosure can be collapsed for ease of storage and transportation, similarly as described previously with respect to FIG. 15. Particularly, the ribs may be collapsed inwardly toward the axis of the enclosure with the web material between the ribs being gathered and collapsed therebetween. From a review of FIG. 18, it will be appreciated that upon collapse of the side wall of the enclosure adjacent the juncture of the side wall and cover, the ribs 52 forming the cover will slowly collapse with the web material being gathered or folded therebetween. In this configuration, the closure part 56 is projected in an axial direction to lie at a greater distance than the enclosure than when in its non-collapsed condition.

Referring now to FIG. 19, there is illustrated another form of the present invention wherein the enclosure may have side walls 12f formed of ribs 18f and webs 20f, similarly as described previously. The upper edge of the enclosure may, however, be provided with a substantially rigid closure 70. Closure 70 may take various forms, as will be appreciated, and in this form may be circular at its lower edge to join with the upper edge of the enclosure. At one side of the closure 70 and above its lower edge, the rigid closure may be recessed in an inward direction indicated at 72, and have a laterally projecting portion 74 through which a handle 76 may be formed. The opposite side of the cover may be provided with a closure cap 78 releasably secured to a mating closure part, not shown, whereby filling and emptying of the container may be accomplished.

As in the previous embodiment, the container of FIG. 19 may be formed by blow molding techniques. Particularly, the width of the slot at the die heads may be controlled to extrude plastic material of sufficient width to form the rigid closure 70 in the opposed mold die parts, the latter having die walls shaped to mold closure 70. Thereafter, the die heads may be adjusted to extrude plastic material of a lesser thickness and to form the rib and web configuration. As before, the ribs and webs are formed by providing notches in the walls of the die parts. Thus, the parison has two different thickness portions which are blown against the two different wall portions of the die parts to form the rigid closure 70 as an integral extension of the rib and web portion of the enclosure.

FIG. 20 represents an enclosure similar to FIGS. 16 and 17 but having tapered and bulbous side walls. That is, the enclosure 12g is comprised of ribs 18g and webs 20g which taper inwardly from the bottom wall for connection at their upper edges to a rigid closure part 56g. As before, closure part 56g may comprise a threaded neck, which cooperates with a threaded cap 58g, for releasably sealing the enclosure. Also as before, the enclosure may be collapsed about a long or central axis for transportation and storage.

While at present blow molding is believed to be the rreferred process for making the embodiments exemplified by FIGS. 16–20, other processes may also be utilized.

In another alternative form hereof not shown, the ribs may be disposed about the enclosure to run in the general direction of the circumference of the enclosure. That is, the ribs are vertically spaced one from the other whereby the shape of the enclosure may be retained. Ancillary supports, for example support rods formed of plastic, may be used internally or externally of the enclosure to provide a frame support for the material in the vertical direction with the ribs maintaining the shape of the enclosure in a longitudinal direction. The ribs may be scored at diametrically opposite positions, or in the case of a rectangular enclosure, at diagonally opposed corners such that the container per se may be stored in a flat condition.

It will thus be appreciated that in accordance with the present invention there has been provided an enclosure which is readily, easily and simply constructed of inexpensive materials which may be disposable or reusable, as desired, in use. The construction is such that the necessary self-supporting body of the enclosure is formed with a minimum of plastic material.

While the invention has herein been shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent enclosures and methods for manufacturing enclosures.

What is claimed is:

1. A method of forming a plastic enclosure having a flexible ribbed side wall portion and a substantially rigid closure therefor comprising the steps of:

extruding a plastic material from a die head having an endless extrusion opening to form a parison including (a) extruding the plastic material to form the flexible ribbed side wall portion of the plastic enclosure and, during extruding according to step (a), forming ribs spaced one from the other about the entire circumference of the parison to form the side wall portion of the enclosure; and (b) sequentially with the formation of said ribs, forming the closure for the enclosure by, as part of the step of extruding the plastic material from the die head and as a continuous part of and integral with said parison forming such enclosure, extruding the substantially rigid portion of the closure as a part of the entire circumference of the parison, the steps (a) and (b) being accomplished with either step preceding the other step.

2. A method according to claim 1 wherein a die head having opposed die parts defining a continuous slot is provided through which the plastic material is extruded, the step of forming the ribs including providing a plurality of grooves in one of the die parts whereby the enclosure has a side wall of alternating thick and thin plastic material and forming the substantially rigid portion by extruding the plastic material from the die head to obtain uniform thickness thereof.

3. A method according to claim 1 wherein the step of extruding the plastic material to form the ribbed side wall portion of the enclosure precedes the step of forming the substantially rigid portion of the enclosure.

4. A method according to claim 1 including the step of disposing the extruded ribbed side wall portion and said rigid portion in a blow mold having mold walls and urging the ribbed side wall portion and said rigid portion against said mold walls to form the enclosure.

5. A method according to claim 1 including forming the substantial rigid portion of substantially uniform thickness, wherein the step of forming ribs includes forming webs between the ribs having thicknesses wherein the webs are flexible, non-self-supporting and formed of thin film plastic material, the step of forming the ribs including forming the ribs to a thickness greater than the thickness of the material forming the webs such that the ribs and webs cooperate to form self-supporting side wall portions of the enclosure.

6. A method according to claim 5 including the step of disposing the extruded ribbed side wall portion and said rigid portion in a blow mold having mold walls and urging the ribbed side wall portion and said rigid portion against said mold walls to form the enclosure.

7. A method according to claim 6 including forming an opening in said rigid portion.

8. A method of forming a plastic enclosure having a ribbed side wall body portion and an integral closure therefor comprising the steps of:

sequentially extruding during a continuous extrusion of plastic material from a die head, a side wall body portion having ribs and webs therebetween both extending longitudinally in the direction of the flow of plastic material from the die head and spaced laterally one from the other about the entire periphery of the enclosure and a substantially rigid closure portion of a thickness greater than the thickness of the webs and extending about the entire periphery of said enclosure.

9. A method according to claim 8 wherein the step of extruding the plastic material to form the ribbed side wall portion of the enclosure precedes the step of forming the substantially rigid portion of the enclosure.

10. A method according to claim 8 including the step of disposing the extruded ribbed side wall portion and said rigid portion in a blow mold having mold walls and urging the ribbed side wall portion and said rigid portion against said mold walls to form the enclosure.

11. A method according to claim 8 including forming the substantial rigid portion of substantially uniform thickness, wherein the step of forming ribs includes forming webs between the ribs having thicknesses wherein the webs are flexible, non-self-supporting and formed of thin film plastic material, the step of forming the ribs including forming the ribs to a thickness greater than the thickness of the material forming the webs such that the ribs and webs cooperate to form self-supporting side wall portions of the enclosure.

12. A method according to claim 11 including the step of disposing the extruded rib side wall portion and said rigid portion in a blow mold having mold walls and urging the ribbed side wall portion and said rigid portion against said mold walls to form the enclosure.

13. A method according to claim 12 including forming an opening in said rigid portion.

* * * * *